(12) United States Patent
Williams (10) Patent No.: US 6,917,908 B2
(45) Date of Patent: Jul. 12, 2005

(54) METHOD OF PILOT TRAINING USING SIMULATED ENGINE FAILURE

(75) Inventor: Robert Arthur Williams, Kennedale, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 848 days.

(21) Appl. No.: 09/810,741

(22) Filed: Mar. 16, 2001

(65) Prior Publication Data

US 2002/0133322 A1 Sep. 19, 2002

(51) Int. Cl.⁷ .................................................. G06G 7/48
(52) U.S. Cl. ............................. 703/8; 244/17.3; 434/35
(58) Field of Search ........................ 703/8; 244/17.13; 434/35

(56) References Cited

U.S. PATENT DOCUMENTS 4,673,356 A  *  6/1987  Schmidt .................... 434/35
4,831,567 A  *  5/1989  Lea ............................ 703/8
5,873,546 A  *  2/1999  Evans et al. ............. 244/17.13

OTHER PUBLICATIONS

Sikorsky 76 Flight Manual—SA 4047–76c–10—Part 2, Section I Description –p. 1–8E; Section V Supplemental Performance Data—pp. 5–44 through 5–47, Revised Sep. 30, 1999.

* cited by examiner

Primary Examiner—Kevin J. Teska
Assistant Examiner—Ed Garcia-Otero
(74) Attorney, Agent, or Firm—Pillsbury Winthrop Shaw Pittman LLP (57) ABSTRACT

The present invention relates to software for training an aircraft pilot to respond to the failure of one or more engines of a multi-engine aircraft during flight. The software simulates engine failure through the use of software imposed power output limits on the one or more engines for which failure is simulated. In certain embodiments, the software of the present invention sets one or more of the engine condition gauges to a fictitious readings corresponding to readings that would be displayed in the event of an actual engine failure.

32 Claims, 9 Drawing Sheets

METHOD OF PILOT TRAINING USING SIMULATED ENGINE FAILURE

TECHNICAL FIELD OF THE INVENTION

The invention relates in general to the field of training pilots to operate an aircraft and, in particular to, in flight training of a pilot using a simulated engine failure of a multi-engine aircraft.

BACKGROUND OF THE INVENTION

Many aircraft designs incorporate multiple engines for power generation. Multi-engine aircraft are generally designed to fly even when one of the aircraft's engines is completely inoperable. Operating such an aircraft, however, can present a serious challenge to a pilot, particularly during the critical transition period between normal flight and flight with one or more inoperable engines. This is especially true where an engine fails catastrophically and without warning. As such, pilots of such aircraft need to be well trained and sufficiently experienced to skillfully manage the situation where one or more engines fail.

In addition, it is desirable to train pilots in an environment and under conditions reflecting an actual in flight engine failure as closely as possible. At the same time, it is desirable to train the pilots without undue risk to the pilot or other personnel and without causing permanent damage to the aircraft, its engines, or its power transmission components.

Normally, the engines of a multi-engine aircraft are of approximately the same size and have approximately the same peak power output. Moreover, the engines are typically operated together at approximately the same speed and power output during flight. During emergencies, these engines are generally designed to produce power well in excess of the normal operating power so that the aircraft can still fly. Although the normal operating range of the engines is generally well below the level at which permanent engine or transmission damage will occur, some degree of permanent engine and/or transmission damage may occur when an engine is operated at or near peak power output for any length of time.

In addition, the life of an aircraft engine is significantly reduced by operating above a certain power output level because of the increased wear and stress on the engine and transmission. This increased strain on the remaining engine or engines is an undesirable condition which both reduces engine reliability and increases the risk to pilots. This increased strain should therefore be avoided if at all possible, and particularly during pilot training.

Compounding the above problems, modern aircraft engines and engine controllers are designed to automatically respond to abrupt changes in engine loading by accelerating the engine at a high rate. This automatic response, although highly desirable in the event of an actual engine failure, in many cases precludes the use of traditional training methods, such as "throttle chops." A throttle chop is an abrupt manual throttle reduction by a trainer riding in the aircraft with the trainee pilot to simulate loss of engine power. If a throttle chop is attempted at medium to high power in a modern aircraft, the good engine or engines may in some cases accelerate so quickly that either a transmission or a good engine is likely to experience a damaging over-torque or over-temperature condition before the pilot can reduce power.

For the reasons outlined above, there remains a need for an improved method of pilot training. In particular, there is a need for pilot training methods that are highly realistic, maintain the safety of the pilot and protect against permanent damage to the aircraft.

SUMMARY OF THE INVENTION

The training method of the present invention simulates an engine failure by placing a software output limiter on the "failed" engines and one or more of the "good" engines. In one embodiment, the software created output limit imposed on the one or more "good" engines is significantly higher than the software created output limit imposed on the one or more "failed" engines. In certain embodiments, the total output of the aircraft is limited to a level that is equal to or less than the maximum power output attainable from the one or more "good" engines. For example, in an aircraft simulating total failure of one of the two engines, each engine having a predetermined maximum power output, the maximum power output of the aircraft while in inoperative engine training mode will be limited to that predetermined power output. Additionally, this maximum power output number is in certain embodiments reduced according to ambient temperature and pressure conditions.

The power demands of the aircraft may be evenly shared by the two engines or shared in some unequal arrangement so as to maximize the realism of the simulation. In the case of unequal power output, the "good" engine, which will be operating at higher power settings, will respond in a manner that more closely mimics the response of an engine operating at an increased power level.

As noted above, it is desirable to incorporate features into the aircraft designed to reduce the amount of engine operation above the dangerous levels. Accordingly, in certain embodiments of the present invention the engine control software imposes "soft" time limits on engine output above certain levels. In a particular embodiment, a two minute time limit is imposed whenever the output of any engine exceeds a first threshold level. In another embodiment, a thirty second time limit is imposed whenever the output of any engine exceeds a second threshold level.

In one embodiment of the invention, the realism of the simulation is enhanced through the use of fictitious gauge readings on the pilot's instrument panel. These gauge readings will reflect torque, measured gas temperature, and engine speed values in excess of the true value for the one or more "good" engines and corresponding values of zero or near zero for the one or more "failed" engines. The fictitious gauge readings are designed to mimic, as closely as possible, the readings that would be generated by an aircraft having one or more failed engines.

One embodiment of the present invention incorporates a separate screen, complementary to the "fictitious" screen, for displaying the true engine statistics at all times. This screen functions as a safety device to be used by both the pilot and the trainer to verify that the failed engine is purely a software simulation and does not reflect any actual engine performance concerns. In certain embodiments, this screen can be used to display necessary engine statistics in the event of a failure of the primary screen.

As a result of the novel features incorporated into the training method of the present invention, the various embodiments of the training method of the present invention are highly realistic from the point of view of a pilot in training. At the same time, this method is much improved over prior methods in both maintaining the safety of the pilot and protecting against permanent damage to the aircraft.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below with reference to multi-engine helicopters, it should be appreciated that the present invention provides many applicable inventive concepts which can be embodied in a wide variety of specific contexts, including multi-engine airplanes and other multi-engine vehicles. The specific embodiments discussed herein are merely illustrative of specific ways to make and use the invention and do not delimit the scope of the invention.

The present invention disclosed herein provides a method for training pilots to deal with unexpected engine failure in a multi-engine aircraft. As described in detail below, the various embodiments of the training method of the present invention are highly realistic from the point of view of a pilot in training. At the same time, this method is much improved over prior methods in maintaining the safety of the pilot and protecting against permanent damage to the aircraft.

Certain embodiments of the training method of the present invention incorporate a method for generating power at a level significantly above that normally achievable with a failed engine without incurring engine or transmission damage. One embodiment of the training method of the present invention comprises the creation and display of fictitious engine statistics reflecting engine conditions as they would be in the event of actual failure of one or more of the aircraft's engines. For the reasons outlined in detail below, the present invention is greatly superior to other inoperative engine training techniques such as the "throttle chop."

Figure 1:
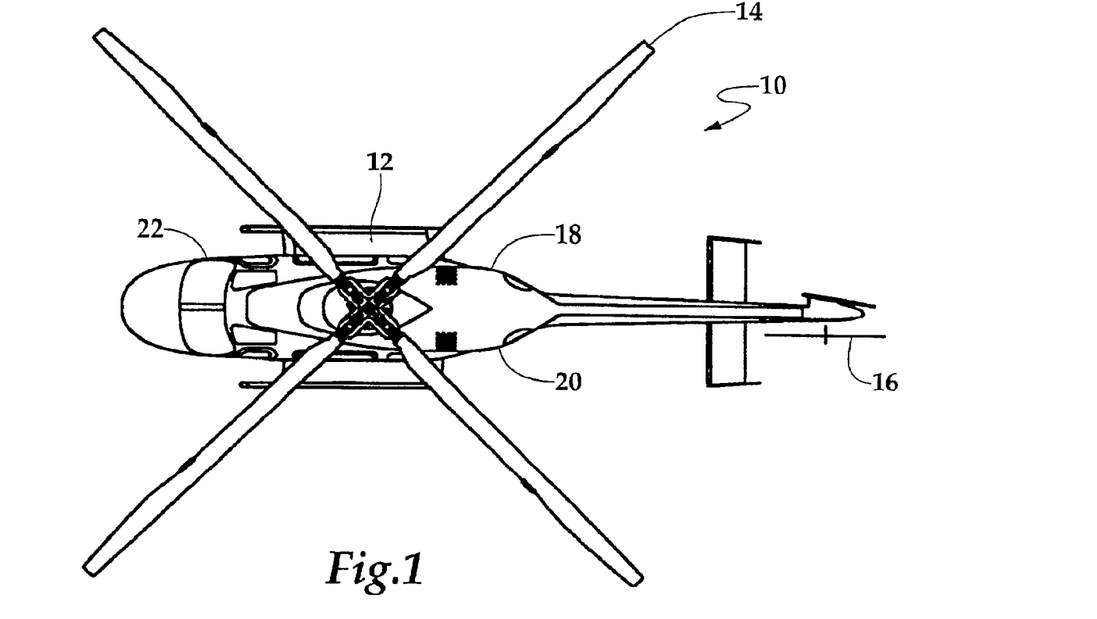
FIG. 1 is an overhead view showing a dual engine aircraft that can incorporate the present invention.

Referring now to FIG. 1, an overhead view of a dual engine aircraft is depicted and generally designated 10. Aircraft 10 comprises a fuselage 12, lift rotor 14, tail rotor 16, engines 13 and 20, and cockpit 22. In this type of aircraft, rotor 14 and rotor 16 receive power from both engine 18 and engine 20 during normal operation. The pilot controls the aircraft 10 from the cockpit 22 by manipulating engines 18 and 20, rotors 14 and 16, and flight control surfaces (not shown).

In the event of failure of either engine 18 or engine 20, the aircraft 10 can remain in flight for some period of time provided that the remaining engine is in proper operating condition. The power required to maintain flight on a single engine, however, can place a considerable strain on the operable engine, such that flight in this mode for any appreciable period of time can result in permanent engine damage.

Although the aircraft 10 is shown as a helicopter with a single lift rotor 14, the invention herein disclosed may be incorporated into a multi engine airplane, a dual rotor helicopter, a tiltrotor aircraft, or any other aircraft having more than one engine.

Figure 2:
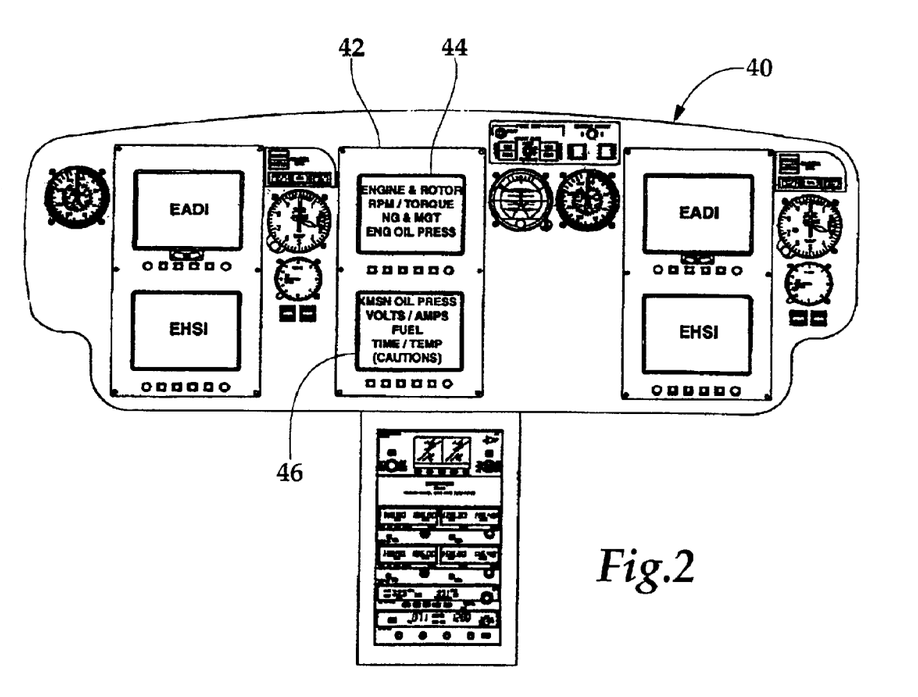
FIG. 2 is a view of an aircraft instrument panel incorporating one embodiment of the present invention.

Referring now to FIG. 2, an aircraft instrument panel is depicted and generally designated 40. Instrument panel 40 comprises a set of gauges and readouts necessary for piloting aircraft 10. In the embodiment shown in FIG. 2, central display portion 42 of instrument panel 40 is designed to work in concert with one embodiment of the present invention to communicate engine conditions to the pilot, including simulated engine failure conditions when required.

In the embodiment shown in FIG. 2, central display portion 42 is segmented into upper display screen 44 and lower display screen 46. During normal operation conditions, when both display screens 44 and 46 and both engines 18 and 20 are fully operational, upper display screen 44 communicates data reflecting engine conditions, while lower display screen 46 communicates data reflecting support system conditions, such as electrical and fuel parameters.

In certain embodiments of the present invention, the content of display screens 44 and 46 will change whenever the engine inoperative training mode is selected. For example, in one embodiment, the upper screen 44 will display fictitious engine conditions whenever the engine inoperative training mode is selected, while the lower display screen 46 will simultaneously display true engine conditions. In another embodiment, either of the display screens 44 and 46 can be set to a composite display mode in which all relevant engine and systems information can be displayed on a single screen. This mode may be initiated, for example, in the event of a malfunction in one of the display screens.

Figure 3:
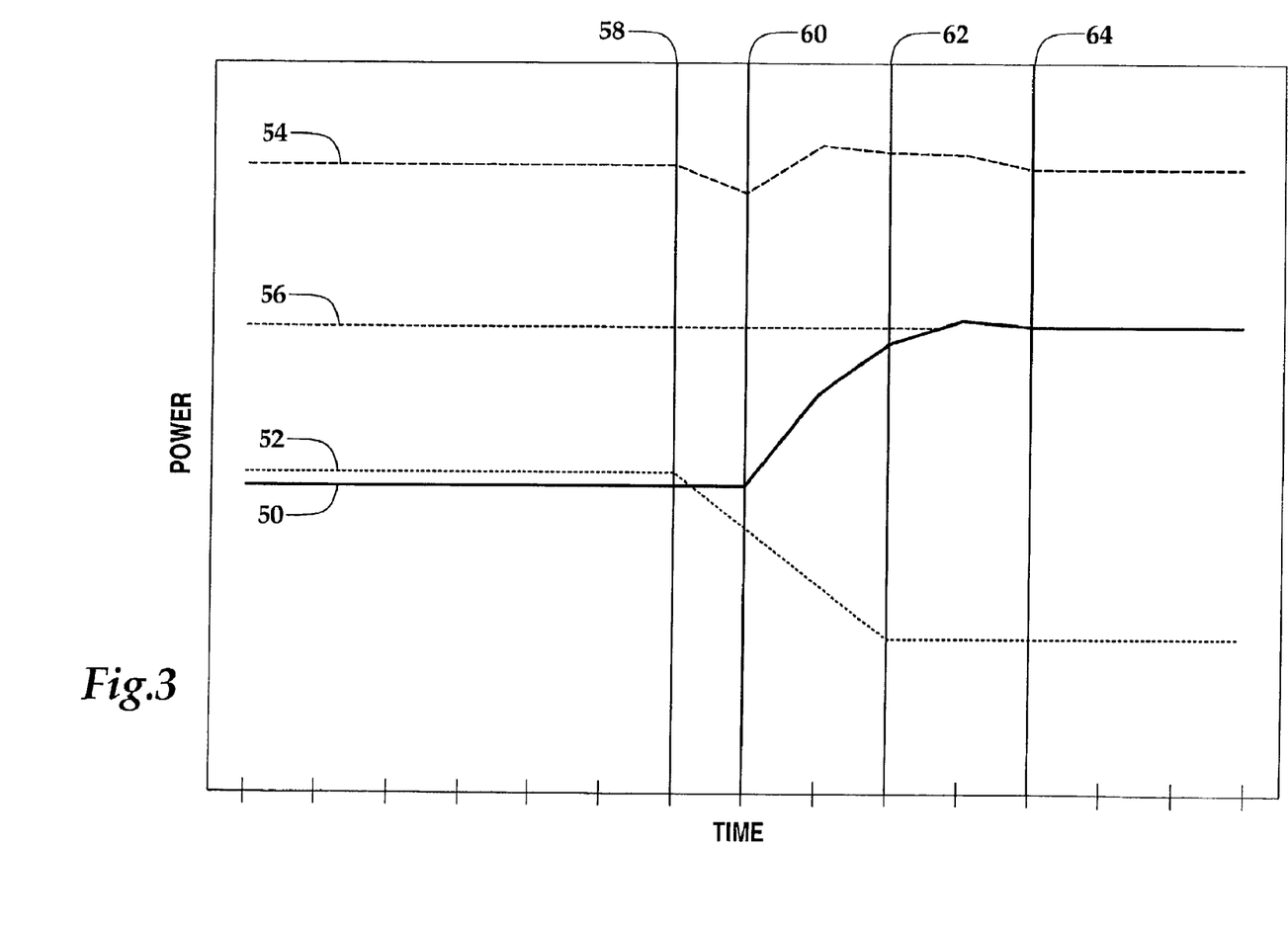
FIG. 3 is a chart of engine power output vs. time for a dual engine aircraft wherein one of the engines experiences a simulated failure according to one embodiment of the present invention.

Referring now to FIG. 3, a chart of engine power output vs. time for a dual engine aircraft operating according to one embodiment of the present invention is depicted. Specifically, the chart captures the transition from normal engine operation to engine inoperative training mode.

The trend lines in FIG. 3 comprise a first engine power 50, a second engine power 52, max continuous single engine power 56 and total aircraft power 54. The first engine power 50 and the second engine power 52 represent the power output of the aircraft's two engines vs. time. Max continuous single engine power 56 represents the maximum power that can be generated continuously by one engine for an indefinite period of time without engine damage. Total aircraft power 54 represents the sum of the first engine power 50 and the second engine power 52.

The left side of the graph depicts the condition of the aircraft engines during normal aircraft operation. The first engine power 50 and the second engine power 52 maintain approximately equal power output levels in this state. At time 58, engine inoperative training mode is initiated and the engine inoperative training software begins to simulate a failing engine by generating engine control signals to dramatically reduce the power output 52 of the second engine. The drop in power 52 of the second engine is reflected in the total aircraft power 54.

At time 60, the engine inoperative training software begins to ramp up the power output 50 of the first engine begins to compensate for the power lost by the second engine. The increase in power is reflected in the total aircraft power 54 after time 60.

In terms of sensory input to the pilot, the quick acceleration of the first engine will cause the aircraft to experience an abrupt yaw. This yaw will be similar in effect, but generally not as great in magnitude, as the yaw that would be experienced by a pilot in an aircraft having a true failed engine. The reason for the lesser magnitude is that the power demand on an operable engine in a true failed engine situation is considerably higher than the power demand on an "operable" engine in the event of a simulated engine failure, as is described below.

The software causes the speed and power of the "failed" engine continue to decline until time 62, after which point the engine is treated by the simulation as a "dead" engine. In reality, the "dead" engine, under the control of the training software, is still producing a considerable amount of power, perhaps as much as several hundred horsepower in certain embodiments. On the fictitious instrument display, however, the engine conditions for the "dead" engine will reflect zero or near zero power and speed. The training software is still accelerating the first engine at time 62 to compensate for the power lost by the "failure" of the second engine. In certain cases, the engine power 50 may overshoot the max steady state level 56 for a brief time. The training software will cause the engine conditions for the "good" engine to reflect a power output level equal to the sum of both the first and second engines on the fictitious instrument display.

At time 64, the training software has stabilized both the "good" engine and the "failed" engine. In the preferred embodiment, the "good" engine is producing power 50 at or near the max continuous single engine power 56. The training software will control the "failed" engine to produce power 52 at an output level considerably below the output level 50 of the "good" engine. In this state, the "good" engine is producing power 50 at a considerably higher level than the "failed" engine. This situation is substantially consistent with the behavior of an aircraft having a real engine failure, and the aircraft will respond to pilot input in a similar manner. At the same time, the training software controls the "failed" engine to provide a considerable amount of power 52 to the aircraft, so that the aircraft can operate at a high level of power output 54 without forcing the "good" engine to operate at a power level 50 above max single engine power 56, which would cause permanent engine damage.

In light of the foregoing, it should be clear that it is preferable that the gap between the power output level of the one or more "good" engines and the one or more "failed" engines be wide enough to create the most realistic simulation possible. It is not, however, critical to the present invention that they have this relationship. In an aircraft design having three or more engines, power output could be equally shared by the two or more "good" engines in the aircraft without departing from the spirit and nature of the present invention. On the other hand, one or more of the "failed" engines could be reduced to zero power in certain embodiments.

Figure 4A:
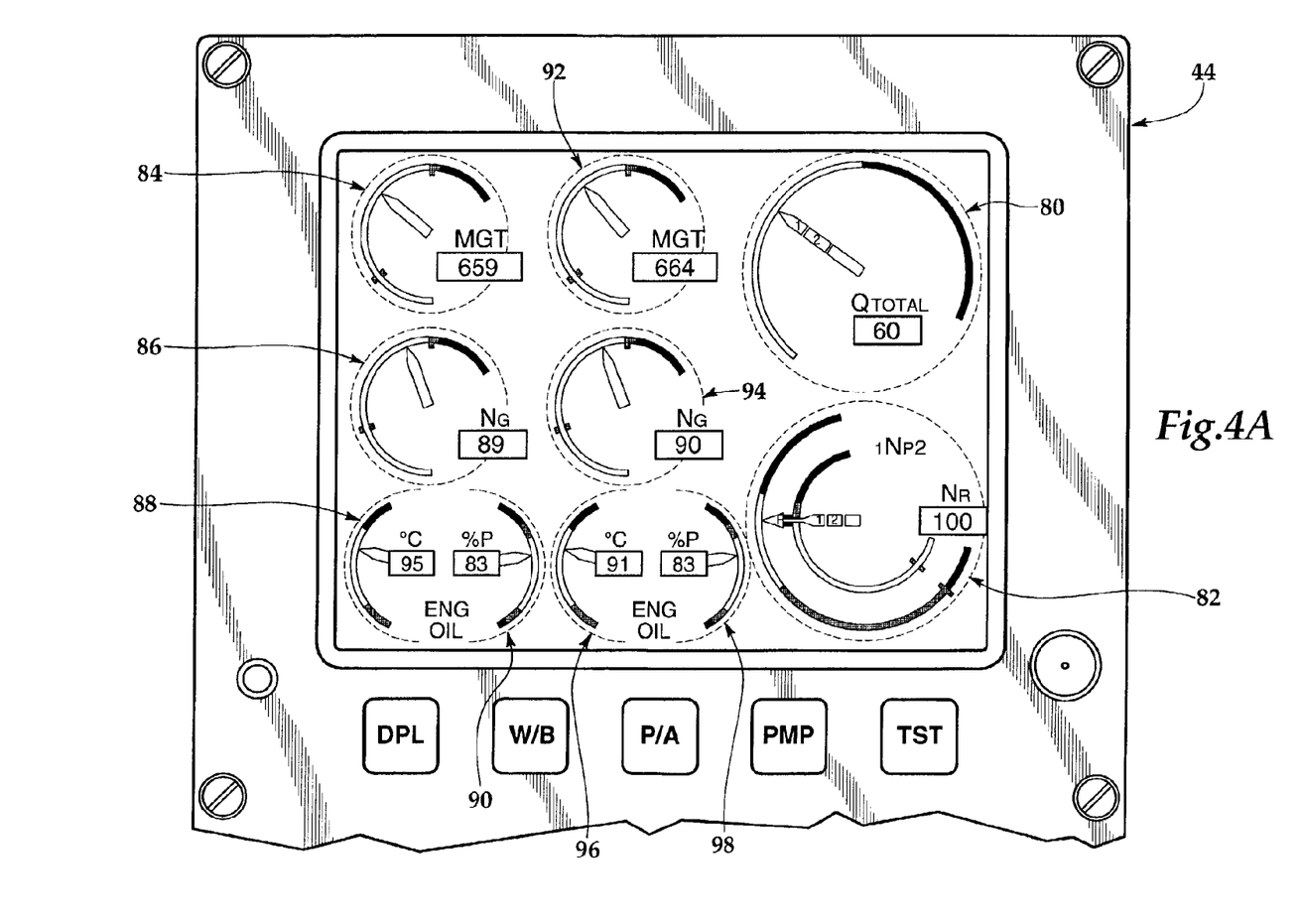
FIG. 4A is a view of a first display screen of an instrument panel incorporating one embodiment of the present invention wherein the engines are operating at a normal power output level.

Referring now to FIG. 4A, a first display screen of an instrument panel incorporating one embodiment of the present invention wherein the engines are operating at a normal power output level is depicted. Upper display screen 44 comprises Qtotal gauge 80, rotor speed gauge 82, a set of first engine gauges 84–90, and a set of second engine gauges 92–98. The engine gauges comprise measured gas temperature gauges 84 and 92, engine speed gauges 86 and 94, engine oil temperature gauges 88 and 96, and engine oil pressure gauges 90 and 98.

Figure 4B:
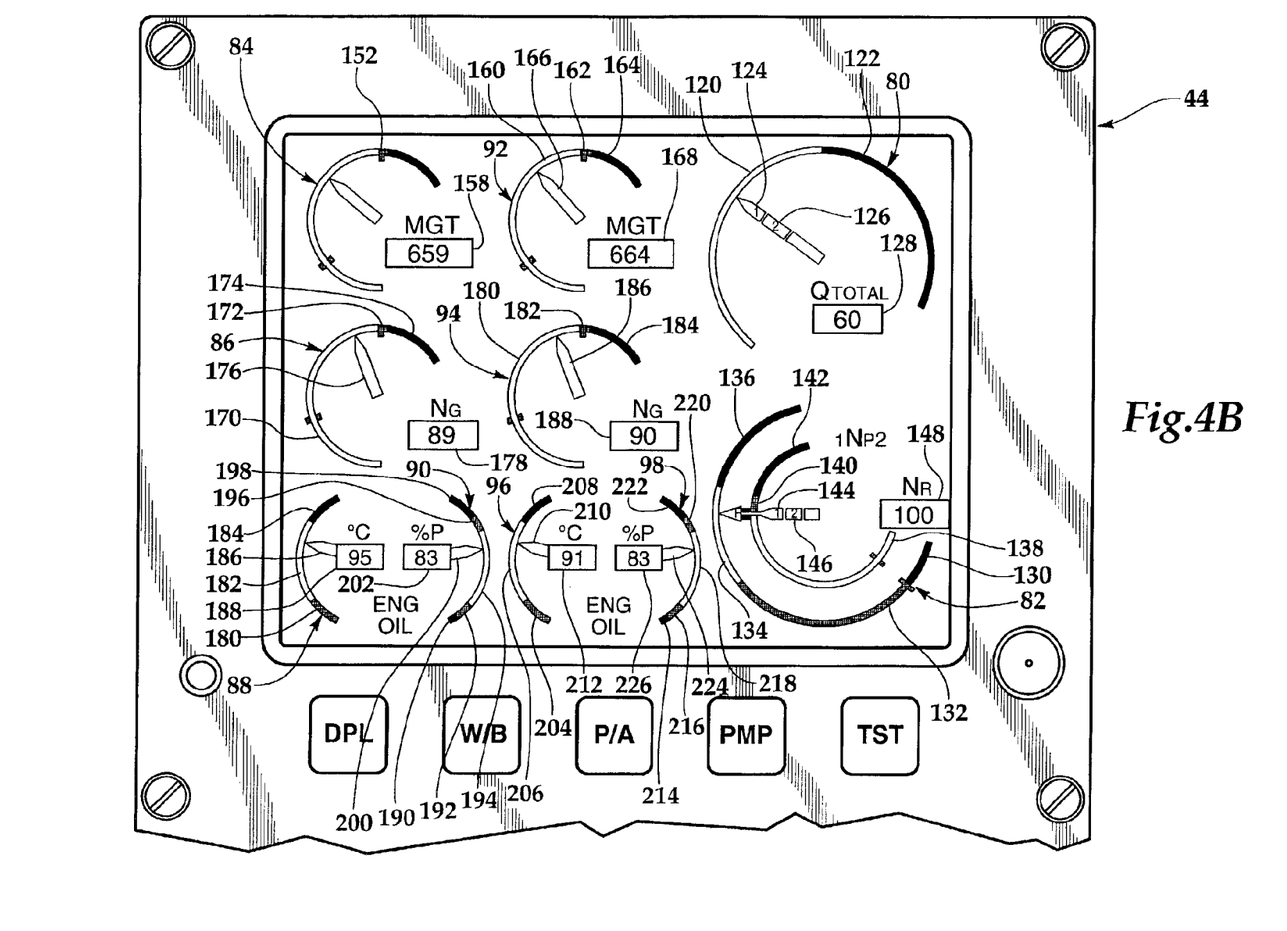
FIG. 4B is a view of the first display screen identifying the gauge sub components.

Turning now to FIG. 4B, the upper engine display screen 44 is described in more detail. Qtotal gauge 80 comprises a normal operating range 120, a critical operating range 122, a first engine needle 124, a second engine needle 126, and a digital readout 128. The Qtotal gauge 80 reflects the total engine output of the aircraft at any given time. During normal operation of the aircraft, needles 124 and 126 will sweep together, reflecting that the two engines operate at approximately the same power output. A normal operating range 120 indicates the range of power output within which the aircraft's engines can operate for an indefinite period of time without sustaining damage. The critical range 122 reflects power levels within which the operating period of the engine or engines in that zone will be limited to a specified time period.

The rotor speed gauge 82 reflects the rotor speed on the outside scale and the power turbine speed on the inner scale. The outer scale of rotor speed gauge 82 comprises low critical range 130, low caution range 132, normal operating range 134, and high critical range 136. The inner scale of rotor speed gauge 82 comprises normal operating range 138, high caution operating range 140 and high critical operating range 142. Rotor speed gauge 82 further comprises indicator needles 144 and 146 reflecting the turbine speed of the first and second engines respectively. Rotor speed gauge 82 also comprises rotor speed digital read out 148.

Engine information gauges 84 through 98 will be described in detail only with respect to the information gauges for the first engine as information gauges for each engine are identical. Turning now to the first engine measured gas temperature gauge 84, this gauge comprises a normal operating range 150, a high caution operating range 152, a critical operating range 154, an indicator needle 156, and a digital read out 158. It can be seen in FIG. 4B that corresponding elements 160–168 of the second engine mean gas temperature gauge 92 are identical to those in gauge 84.

The first engine speed gauge 86 comprises a normal operating range 170, a high caution operating range 172, a high critical operating range 174, an indicator needle 176, and a digital read out 178. Again, elements 180–188 of the second engine speed gauge 94 are identical to the corresponding elements 170–178 of gauge 86.

The first engine oil temperature gauge 88 comprises a low caution range 180, a normal operating range 182, a high critical range 184, an indicator needle 186, and a digital readout 188. The first engine oil pressure gauge 90 comprises a low critical range 190, low caution range 192, normal operating range 194, high caution range 196, high critical range 198, indicator needle 200, and digital read out 202. Elements 204–222 of the second engine oil gauges 96 and 98 are identical to elements 180–202 of the first engine oil gauges 88 and 90.

The display 44 shown in FIGS. 4A and 4B depicts a situation in which a dual engine aircraft and its two engines are operating under normal conditions with both engines fully operational. The screen 44 shown in FIGS. 4A and 4B employs digital representations of traditional needle type gauges for the communication of information from the aircraft to the pilot. There is nothing within the nature of the invention, however, limiting the present invention to this type of display. The present invention would be equally operable using actual needle type gauges, purely numeric readouts, or any other manner of communicating information known in the art of instrumentation. Additionally, there is nothing within the nature of the present invention limiting its implementation to an aircraft having only two engines. The teachings disclosed herein are equally applicable to aircraft having three or more engines.

Figure 5:
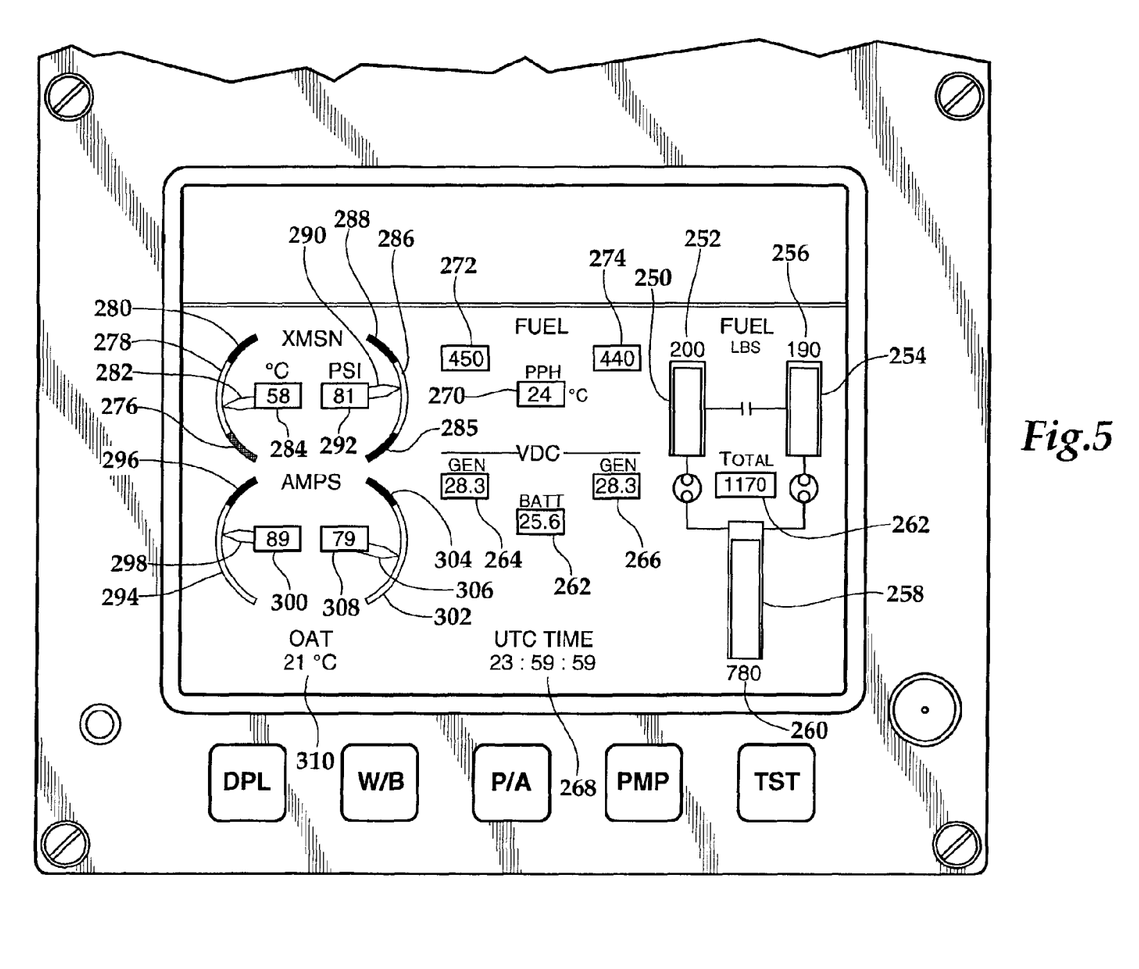
FIG. 5 is a view of a second display screen of an instrument panel of the present invention.

Turning now to FIG. 5, a lower display screen is depicted and generally designated 46. In normal operation, lower display screen 46 displays information related to the aircraft transmission, aircraft electrical systems, and aircraft fuel systems. Fuel reserves data is displayed in elements 250–260 of display screen 46. The aircraft shown in this embodiment has three separate fuel reservoirs, graphically represented in elements 250, 254, and 258. Each of these elements comprises a bar chart graphically depicting the amount of fuel remaining in the reservoir. These amounts are displayed in digital format in elements 252, 256 and 260, each corresponding to one of the graphical elements 250, 254 or 258. The total fuel value is displayed in element 262. The first and second engine fuel consumption rates are displayed in boxes 272 and 274, respectively. Fuel temperature is displayed in box 270.

System voltage and battery storage are displayed in elements 262–266. Element 262 displays the battery voltage, while elements 264 and 266 display the engine generator voltages of the two engines, respectively. Clock 268 displays the current time in hours, minutes, and seconds.

Transmission condition data is displayed by elements 276–284. The transmission temperature gauge comprises a low caution range 276, a normal operating range 278, a high critical range 280, an indicator needle 282, and a digital display 284. Elements 285 through 292 display the transmission fluid pressure in pounds per square inch. The transmission fluid pressure gauge comprises a low caution range 285, a normal operating range 286, a high critical range 288, an indicator needle 290, and a digital read out 292.

Engine amperage demand is displayed by gauge elements 296 through 308. The amperage data for the first engine is displayed in elements 296–300. The first engine amperage gauge comprises a normal operating range 294, a high critical operating range 296, an indicator needle 298, and a digital read out 300. Elements 302–308 perform the same functions for the second engine. Element 310 displays the current OAT in degrees Celsius.

Figure 6:
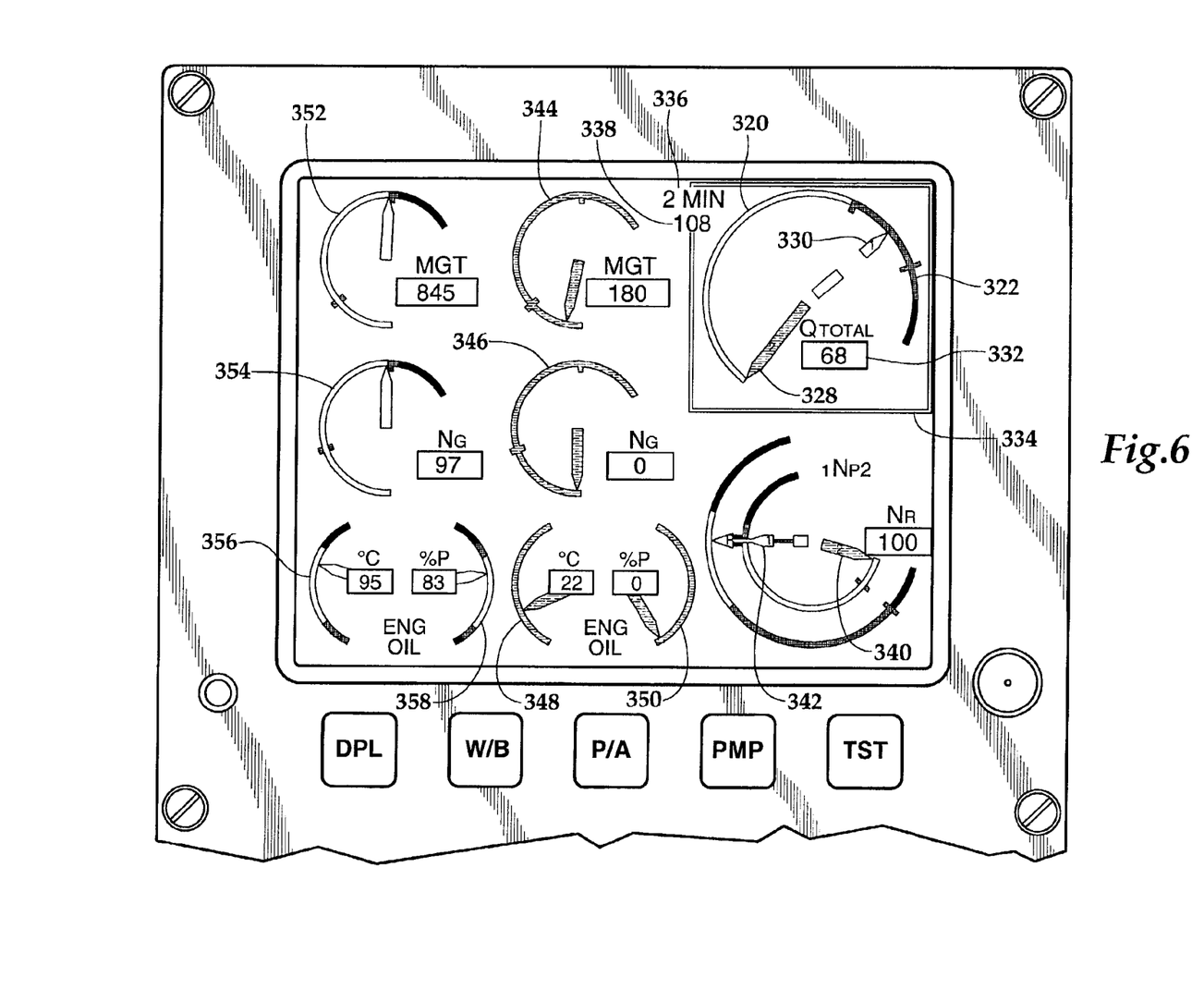
FIG. 6 is a view of the first display screen as it appears in the event of an actual engine failure.

FIG. 6 depicts the upper display screen 44 as it appears in the event of an actual failure of engine number 2. It is readily apparent from this screen that all gauges reflecting the condition of the second engine, such as mean gas temperature gauge 344, speed gauge 346, and engine oil gauges 348 and 350, have dropped to zero or near zero levels. Additionally, each of these gauges has been grayed out by the software to indicate that this engine is dead.

Gauges 352–358 reflect the actual engine data for the first engine which, as can be seen in FIG. 6, is operating at a higher than normal power output level. It can be seen in Qtotal gauge 80 that the indicator needle 328 for the second engine has dropped to zero and that the indicator needle 330 for the first engine has exceeded the normal operating range 320 and moved into the critical operating range 322.

At the point in time shown in FIG. 6, the first engine is operating at the "two minute" power output level. This is reflected graphically by the box 334 around gauge 80 as well as the "2 MIN" text box 336 and seconds remaining indicator 338. It can be seen in read out box 332 that the Qtotal value of the aircraft, at 68, is not significantly different from the Qtotal values shown in FIGS. 4 and 4A. The loss of the second engine, however, requires that the first engine produce a dramatically higher level of output to compensate.

Figure 7:
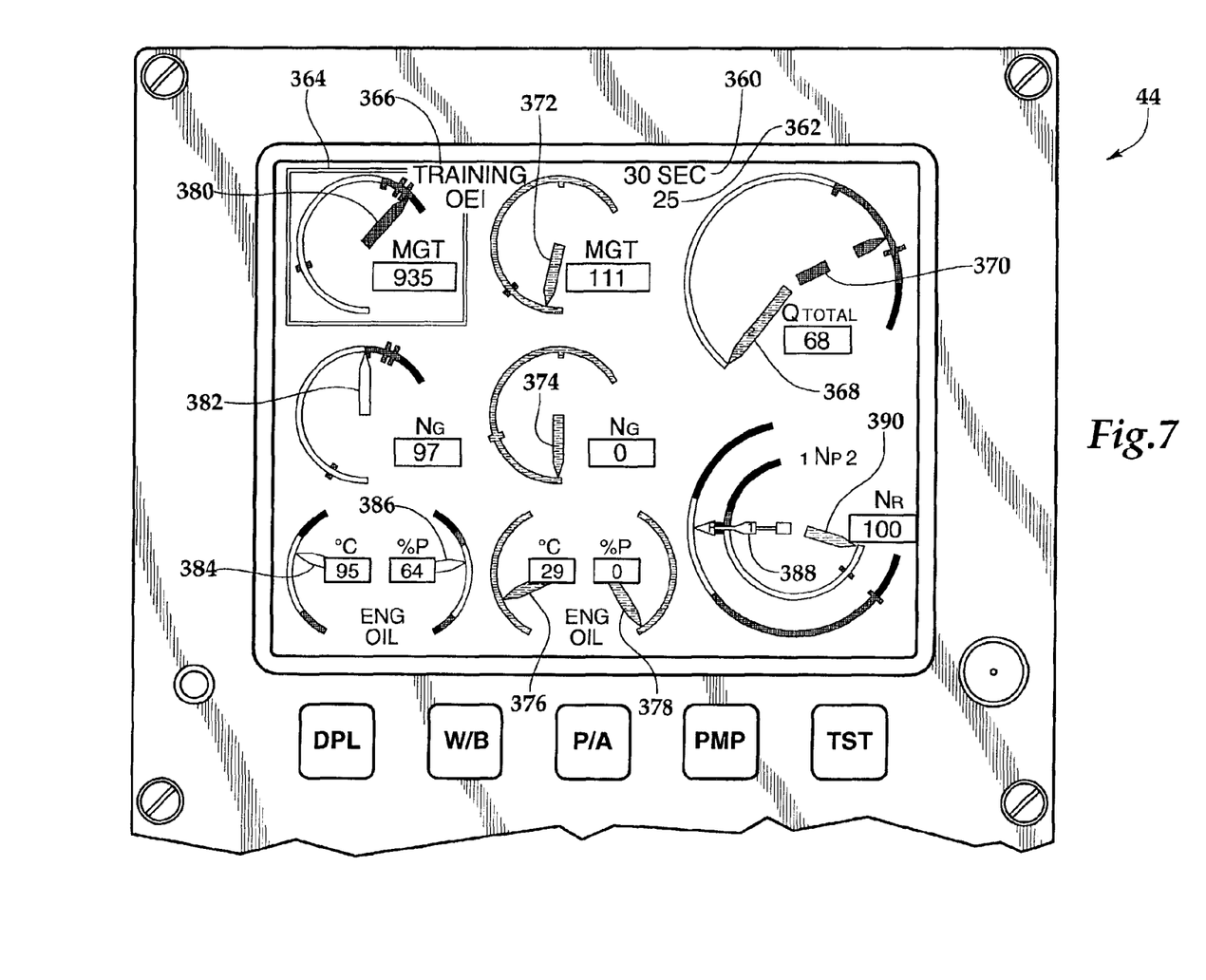
FIG. 7 is a view of the first display screen as it appears in the event of a simulated engine failure according to one embodiment of the present invention.

FIG. 7 depicts the upper display screen 44 as it appears in the event of a simulated engine failure according to one embodiment of the present invention. The pilot is made aware that the software is in simulated engine failure mode by the words "TRAINING OEI" designated 366. As with the actual engine failure depicted in FIG. 6, the engine performance gauges for the second engine comprising mean gas temperature 372, engine speed gauge 374, and engine oil gauges 376 and 378 are shown greyed out, indicating that this engine has "failed." Additionally, power indicator needle 368 and turbine speed indicator 390 for the second engine are shown greyed out. In contrast to the display in FIG. 6, however, showing actual engine statistics, the display in FIG. 7 is entirely fictitious. In reality, the second engine remains fully operational and is producing a significant amount of power.

Gauges 372–378 for "inoperative" engine 2 are not the only gauges having fictitious readings thereon. Gauge readings 380–386, reflecting the condition of engine 1 are also fictitious. Although the first engine is producing a higher level of power than the second engine, it is not producing the power or operating under the conditions indicated by gauges 380–386.

Indicators 370 and 390 also reflect a higher level of performance than the first engine is truly generating. For the purposes of this simulation, however, the training software has alerted the pilot to the fact that the first engine has entered into the 30 second power output level, as indicated by indicator 360, and that there are 25 seconds remaining in that operating window, as indicated by 362.

Figure 8:
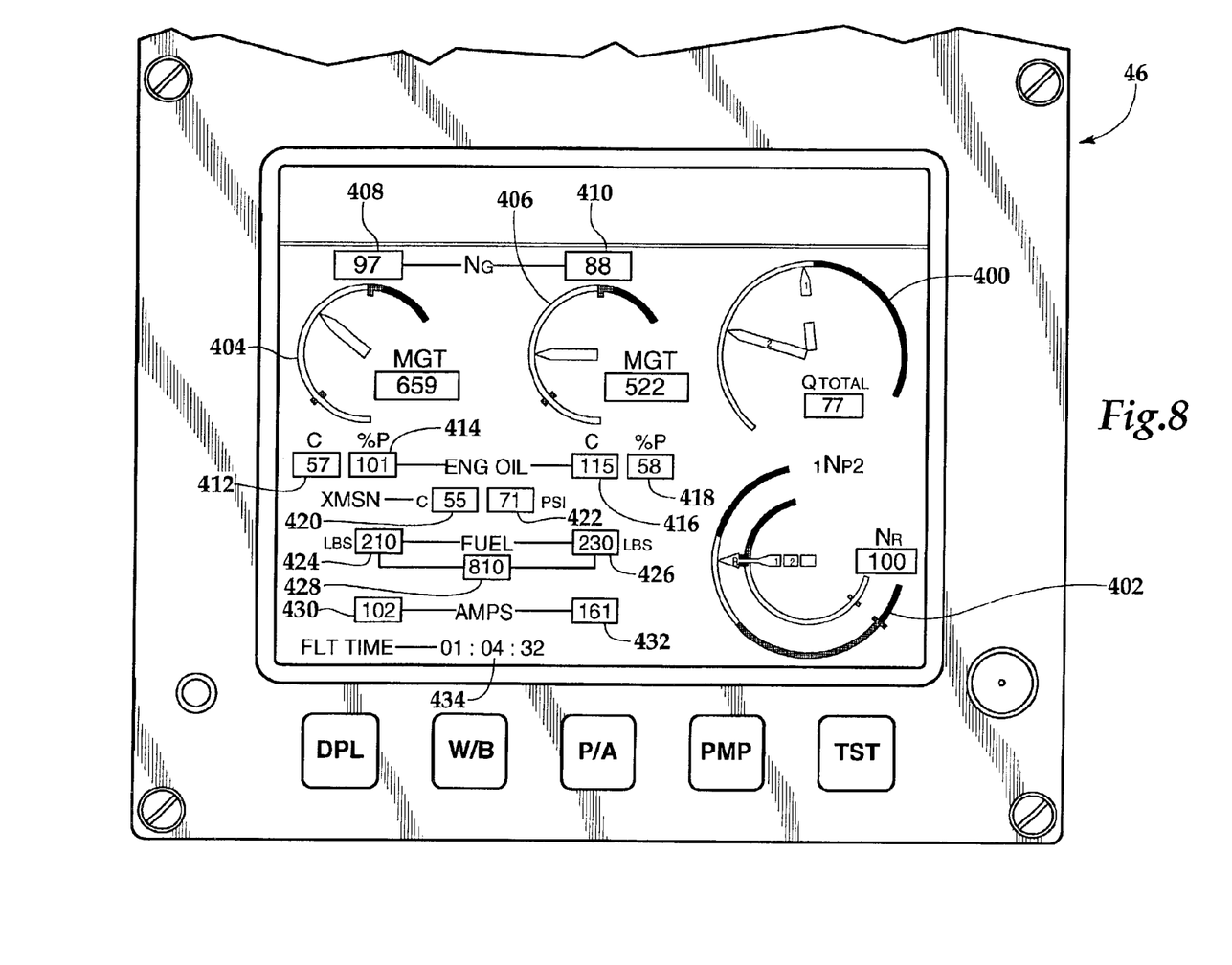
FIG. 8 is a view of the second display screen as it appears in the event of a simulated engine failure or a failure of the first display screen.

FIG. 8 depicts the single screen composite display as it appears in the event of a failure of either of the display screens or in the event that engine inoperative training mode has been initiated. The purpose of the composite display shown in FIG. 8 is to provide the pilot with all of the relevant performance data for the aircraft on a single screen. This feature can be invoked to allow the pilot to have access to all vehicle performance information even though one of the display screens is malfunctioning. The composite display is initiated in the one engine inoperative mode in order to allow the pilot constant access to true engine indicators. The composite display comprises Qtotal gauge 400, rotor speed gauge 402, the first engine mean gas temperature gauge 404, the second engine mean gas temperature gauge 406, engine speed gauges 408 and 410, engine oil gauges 412–418, transmission gauges 420 and 422, fuel gauges 424–428, amperage gauges 430 and 432, and clock 434.

Figure 9:
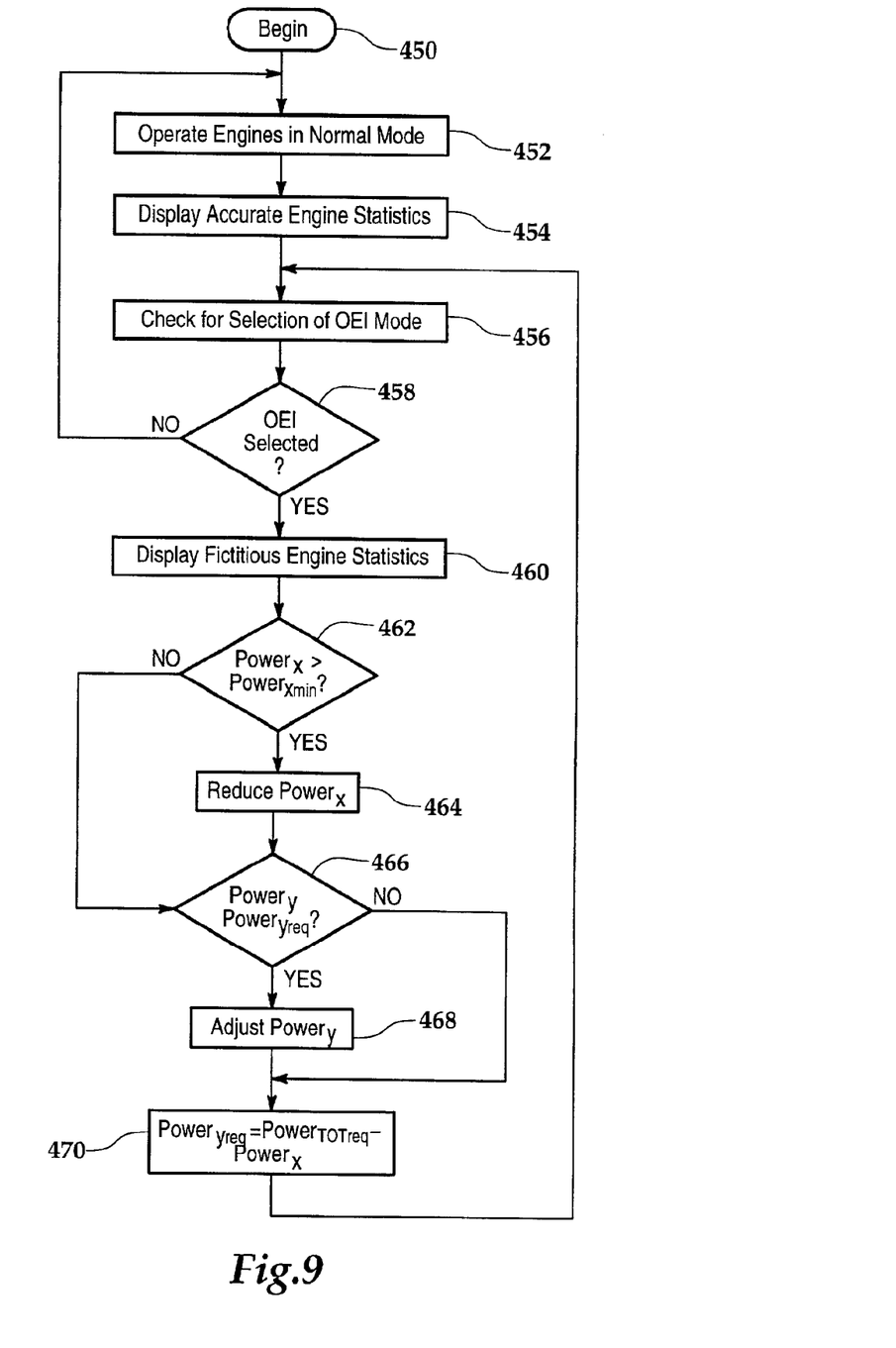
FIG. 9 is a flowchart of the engine control process for a dual engine aircraft incorporating a first and second engine one of which experiences a simulated failure according to one embodiment of the present invention.

FIG. 9 depicts a flowchart representing the operation of one embodiment of the present invention. The aircraft in this embodiment has two engines designated 1 and 2. In this embodiment, either of engines 1 or 2 can be selected to undergo a simulated failure. The engine experiencing simulated failure is designated engine X in this flowchart. The remaining engine is designated figure Y.

The process flow begins in oval 450, proceeding to block 452 where the aircraft operates in normal mode with each of the aircraft's engines 1 and 2 producing approximately the same amount of power. As a result, accurate engine statistics are displayed for the pilot on the engine status display screen in block 454. The software checks whether one engine inoperative (OEI) training mode has been selected in block 454.

If OEI mode has not been selected, then process flow is directed by decision diamond 458 back to normal operation block 452 and the process repents as described above. If OEI has been selected, the process flow is directed by decision diamond 458 to blocks 460–470, representing aircraft operation in the OEI training mode. In certain embodiments of the present invention, decision diamond 458 will involve an inquiry into whether the aircraft can safely perform the simulation such as, for example, whether both engines continue to operate at an optimal level. In certain embodiments, the simulation may end automatically if a fault is detected in any one or more of a set of monitored aircraft systems.

In block 460, the software calculates and displays a set of fictitious engine statistics to the pilot. In certain embodiments, these statistics will be based on the true engine statistics, but will be modified so as to simulate the statistics likely to be displayed in the event of an actual engine failure.

Decision diamond 462 determines whether the power output of engine X ($POWER_x$) exceeds the power output desired to be produced during engine inoperative training mode ($POWER_{xmin}$) if $POWER_x$ exceeds $POWER_{xmin}$, the power output level of engine X is reduced by some amount to more closely approach the power output desired to be produced during engine inoperative training mode in bloc 464. The process flow represented by block 462 and 464 can take any number of forms known in the art of process control to be useful in bringing a measured output level into conformance with a desired output level. After $POWER_x$ is adjusted in block 464, or if $POWER_x$ does not exceed $POWER_{xmin}$, as determined in decision diamond 462, the system compares the power output of engine Y ($POWER_Y$) against the power required from engine Y ($POWER_{Yreq}$) in decision diamond 466.

If there is a variance between $POWER_Y$ and $POWER_{Yreq}$, $POWER_Y$ is adjusted to meet the needs of the pilot, in block 468. This adjustment is limited, of course, by the physical acceleration limits of the engine. After $Power_y$ is adjusted in block 468 or if $Power_y = Power_{yreq}$ as defined in decision diamond 466, a new value for $POWER_{Yreq}$ is calculated. The updated value for $POWER_{Yreq}$ is equal to the total power demanded by the pilot ($POWER_{TOTreq}$) minus the output of engine X ($POWER_x$). After this new value is calculated and assigned to $POWER_{Yreq}$, process flow returns to block 456, where the system checks to determine whether OEI mode is still desirable. If OEI mode is still selected, then process control moves to block 460, marking the beginning of the OEI mode process flow and the process repeated as described above. If OEI mode is no longer selected, process control returns to block 452, where the engines and display are returned to normal operating mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A method for simulating an engine failure in a multiple-engine aircraft, the method comprising:

reducing the power output of a first engine to simulate the engine failure;

increasing the power output of at least a second engine to compensate for the reduction of the power output of the first engine; and displaying fictional engine condition data simultaneously with accurate engine condition data.

2. The method of claim 1, wherein the aircraft has more than two engines.

3. The method of claim 1, wherein the aircraft is a helicopter.

4. The method of claim 1, further comprising:

checking one or more aircraft safety systems before starting the simulation.

5. The method of claim 1, further comprising:

limiting the total power output of the aircraft to the maximum power output of the engines which are not simulating the engine failure;

limiting the power output level of each engine which is not simulating the engine failure to a level at or below the level at which engine damage will occur; and limiting the total power output of the engines which are simulating the engine failure to a level at or below the total power output of the aircraft minus the total power output of the engines which are not simulating the engine failure.

6. The method of claim 1, further comprising:

monitoring one or more aircraft systems and returning the aircraft to normal operation whenever a fault is detected in any monitored system.

7. The method of claim 1, wherein the displaying fictional engine condition data simultaneously with accurate engine condition data includes displaying fictional engine condition data for each of the first and second engines simultaneously with accurate engine condition data for each of the first and second engines.

8. The method of claim 1, wherein the displaying of fictional engine condition data simultaneously with accurate engine condition data includes displaying the fictional engine condition data on a first display device and displaying the current, accurate engine condition data on a second display device, which is separate from the first display device.

9. A method for simulating an engine failure in a multiple-engine aircraft, the method comprising:

reducing the power output of a first engine to simulate the engine failure;

increasing the power output of at least a second engine to a power level sufficient to permit aircraft flight without significant damage to any engine; and displaying fictional engine condition data indicating that the power output of the first engine is substantially zero and that the power output of the second engine is higher than the true power output, wherein accurate engine condition data is provided in combination with the fictional engine condition data.

10. The method of claim 9, wherein the fictional engine condition data is displayed on a flat panel display.

11. The method of claim 9, further comprising:

providing an alert any time the fictional power output of any engine exceeds the maximum power output attainable without engine damage.

12. The method of claim 9, wherein the fictional engine condition data is provided in the form of needle type gauges in combination with digital readouts.

13. The method of claim 9, wherein
the displaying fictional engine condition data and providing accurate engine condition data includes displaying fictional engine condition data for each of the first and second engines simultaneously with accurate engine condition data for each of the first and second engines.

14. The method of claim 9, wherein
the displaying of fictional engine condition data and the providing of accurate engine condition data includes displaying the fictional engine condition data on a first display device and displaying the current, accurate engine condition data on a second display device, which is separate from the first display device.

15. A computer-readable media encoded with a computer program for simulating an engine failure in a multiple-engine aircraft, the program comprising a method of:
   reducing the power output of at least one engine to simulate the engine failure;
   increasing the power output of at least a second engine to a power level sufficient to permit aircraft flight without significant damage to any engine; and
   displaying fictional engine condition data simultaneously with accurate engine condition data.

16. The computer-readable media of claim 15, wherein
the aircraft has more than two engines.

17. The computer-readable media of claim 15, wherein
the aircraft is a helicopter.

18. The computer-readable media of claim 15, wherein the method further comprises:
   limiting the total power output of the aircraft to the maximum power output of the engines which are not simulating the engine failure;
   limiting the power output level of each engine which does not have a simulated engine failure to a level at or below the level at which engine damage will occur; and
   limiting the total power output of the engines which do have a simulated engine failure to a level at or below the total power output of the aircraft minus the total power output of the engines which are not simulating the engine failure.

19. The computer-readable media of claim 15, wherein the method further comprises:
   monitoring one or more aircraft systems and returning the aircraft to normal operation whenever a fault is detected in any monitored system.

20. The computer-readable media of claim 15, wherein
the displaying fictional engine condition data simultaneously with accurate engine condition data includes displaying fictional engine condition data for each of the first and second engines simultaneously with accurate engine condition data for each of the first and second engines.

21. A computer-readable media encoded with a computer program for simulating engine failure in a multiple-engine aircraft, the program comprising a method of:
   reducing the power output of an engine having a simulated engine failure;
   increasing the power output of a second engine to a power level sufficient to permit aircraft flight without significant damage to any engine; and
   displaying fictional engine condition data indicating that the power output of the simulated failed engine is zero and that the power output of at least one of the remaining engines is higher than the true value, wherein accurate engine condition data is provided in combination with the fictional engine condition data.

22. The computer-readable media of claim 21, wherein
the fictional engine condition data is displayed on a flat panel display.

23. The computer-readable media of claim 21, wherein the method further comprises:
   providing an alert any time the fictional power output of any engine exceeds the maximum power output attainable without engine damage.

24. The computer-readable media of claim 21, wherein
the aircraft system condition data is provided in the form of needle type gauges in combination with digital readouts.

25. The computer-readable media of claim 21, wherein
the displaying fictional engine condition data and providing accurate engine condition data includes displaying fictional engine condition data for each of the first and second engines simultaneously with accurate engine condition data for each of the first and second engines.

26. A multiple-engine aircraft comprising:
   a first engine;
   a second engine;
   a computer-readable media encoded with a computer program, the program comprising a method of;
   reducing the power output of the first engine to simulate engine failure;
   increasing the power output of the second engine to compensate for the reduction of the power output of the first engine; and
   displaying fictional engine condition data simultaneously with accurate engine condition data.

27. The aircraft of claim 26, further comprising:
   a third engine.

28. The aircraft of claim 26, wherein
the aircraft is a helicopter.

29. The aircraft of claim 26, wherein the method further comprises:
   checking one or more aircraft safety systems before reducing the power to any engine.

30. The aircraft of claim 26, wherein the method further comprises:
   limiting the total power output of the aircraft to the maximum power output of the engines which are not simulating the engine failure;
   limiting the power output level of each engine which is not simulating the engine failure to a level at or below the level at which engine damage will occur; and
   limiting the total power output of the engines which are simulating the engine failure to a level at or below the total power output of the aircraft minus the total power output of the engines which are not simulating the engine failure.

31. The aircraft of claim 26, wherein the method further comprises:
   monitoring one or more aircraft systems and returning the aircraft to normal operation whenever a fault is detected in any monitored system.

32. The aircraft of claim 26, wherein
the displaying fictional engine condition data simultaneously with accurate engine condition data includes displaying fictional engine condition data for each of the first and second engines simultaneously with accurate engine condition data for each of the first and second engines.

* * * * *